(12) United States Patent
Missell et al.

(10) Patent No.: US 6,440,540 B1
(45) Date of Patent: Aug. 27, 2002

(54) ELECTROPHOTOGRAPHIC TONER RECEIVING MATERIAL

(75) Inventors: Gregory E. Missell, Penfield; Douglas E. Bugner, Rochester, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/074,982

(22) Filed: Feb. 13, 2002

Related U.S. Application Data

(62) Division of application No. 09/722,636, filed on Jan. 30, 2001, now Pat. No. 6,365,317, which is a division of application No. 09/204,848, filed on Dec. 3, 1998.

(51) Int. Cl.[7] ................................................. B41M 5/00
(52) U.S. Cl. ...................................................... 428/195
(58) Field of Search ......................................... 428/195

(56) References Cited

U.S. PATENT DOCUMENTS

| | | |
|---|---|---|
| 3,953,374 A | 4/1976 | Windhager |
| 4,132,674 A | 1/1979 | Hwana |
| 4,259,411 A | 3/1981 | Windhager et al. |
| 4,642,247 A | 2/1987 | Mouri et al. |
| 4,711,816 A | 12/1987 | Wittnebel |
| 5,093,306 A | 3/1992 | Mukoyoshi et al. |
| 5,098,952 A | 3/1992 | Blasko et al. |
| 5,159,053 A | 10/1992 | Kolycheck et al. |
| 5,302,439 A | 4/1994 | Malhotra et al. |
| 5,342,889 A | 8/1994 | Sullivan et al. |
| 5,451,458 A | 9/1995 | Malhotra |
| 5,460,874 A | 10/1995 | Rao |
| 5,508,135 A | 4/1996 | Lelental et al. |
| 5,837,416 A | 11/1998 | Tavernier et al. |
| 5,866,287 A | 2/1999 | Christian et al. |
| 6,042,985 A | 3/2000 | Matsuda et al. |

FOREIGN PATENT DOCUMENTS

| | | |
|---|---|---|
| JP | 5216322 | 8/1993 |
| JP | 6320879 | 11/1994 |

*Primary Examiner*—John Goodrow
(74) *Attorney, Agent, or Firm*—Chris P. Konkol

(57) ABSTRACT

A receiver material, especially a receiver sheet, for electrophotographic thermoplastic toner particles provides toner images of photographic quality and high gloss in both the toned and untoned areas of the sheet. The paper support of the receiver material is protected against moisture damage by a thermoplastic hold-out layer on which is formed a thermoplastic toner receiving layer that is adhesively compatible with the toner and with the hold-out layer. The receiver material, including support, hold-out layer and toner receiving layer, has a volume resistivity of $1.0 \times 10^8$ to $1.0 \times 10^{13}$ ohm-cm and can be electrostatically charged by back-side charging to receive toner by electrostatic transfer.

4 Claims, 1 Drawing Sheet

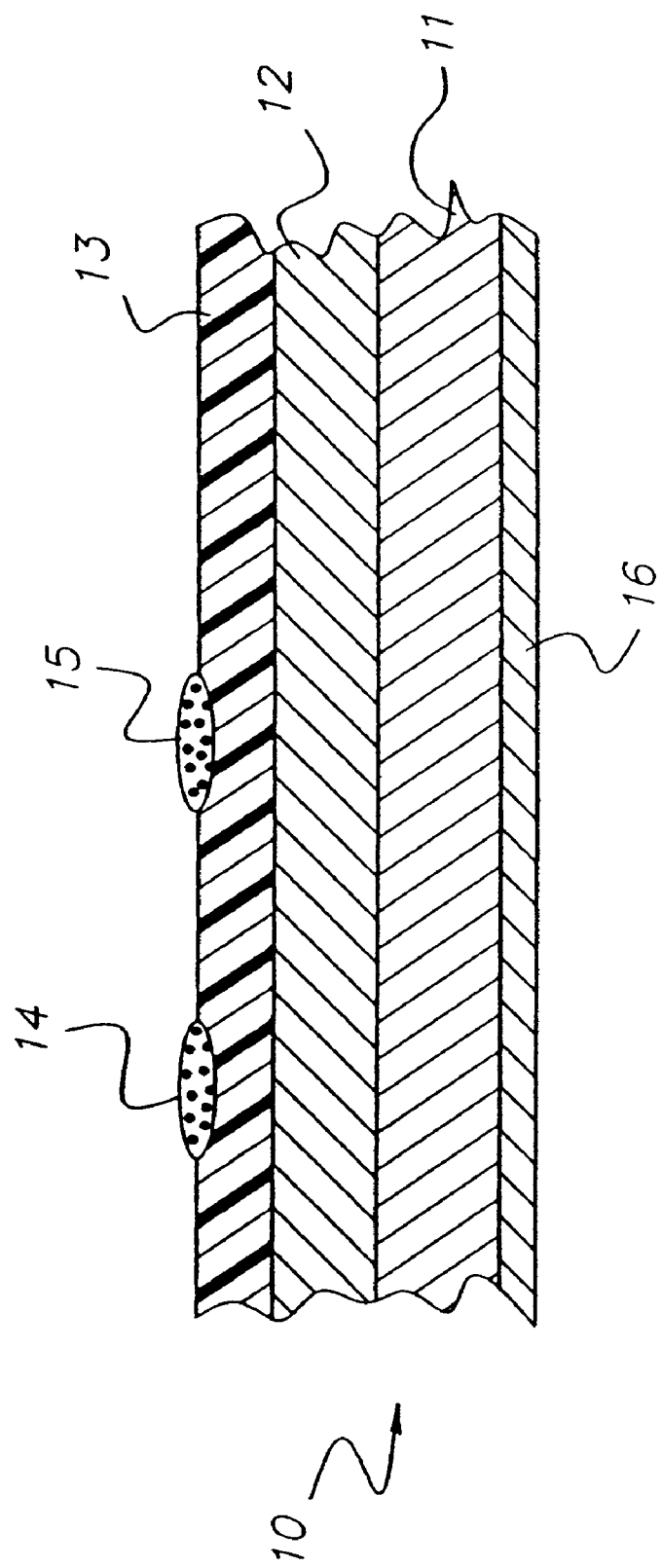

ELECTROPHOTOGRAPHIC TONER RECEIVING MATERIAL

CROSS-REFERENCE TO RELATED APPLICATION

This is a divisional of application U.S. Ser. No. 09/772,636 filed Jan. 30, 2001 now U.S. Pat. No. 6,365,317, which is a Divisional of application U.S. Ser. No. 09/204,848 filed Dec. 3, 1998.

FIELD OF THE INVENTION

This invention relates to a receiving material for electrophotographic toner and, more particularly, to such a material on which can be formed an image of high photographic quality that has substantially uniform gloss in the entire image area and to a method for making such materials.

BACKGROUND OF THE INVENTION

In electrophotographic copying and laser printing, an electrostatic latent image is formed on a photoconductive surface and, for dry development, is then contacted with dry electrostatically charged toner particles which comprise a thermoplastic binder polymer and a pigment. The resulting pattern of toner particles is then transferred, usually by electrostatic attraction, to a receiving material, e.g., a sheet or web of paper, to which the toner is fixed by heat and pressure, e.g., by passage through the nip of heated fuser rolls or a fuser belt, thus forming an electrophotographic toner image on the receiving material. This widely used office technology is quite successful in forming black-and-white copies of documents, using paper sheets as the receiving material. The known procedures, however, are not entirely successful in forming images that have the high quality of continuous tone images formed by conventional silver halide photography. In particular, electrophotographic prints or copies of such images on paper have lacked the uniform gloss and the feel of prints made by conventional photography. The present invention provides a novel receiving material for electrophotographic toner and a method for making such material. With the novel receiver material, continuous tone images of high quality and substantially uniform gloss in the entire image area can now be obtained by electrophotography.

Although receiver sheets for electrophotographic toners are most often paper, an untreated paper surface is usually too rough to give a toner transfer image of high resolution. A particularly serious disadvantage of a paper receiver sheet is that, being fibrous and hydrophilic, it unavoidably contains moisture. Accordingly, when heated in the toner fusing step, the moisture in the paper vaporizes and causes buckling and distortion of the toned image, especially in large areas of toner. In addition, a paper receiving sheet is susceptible upon exposure to water to distortion, tearing and other damage.

A need exists for an improved paper toner receiver sheet, especially for forming glossy continuous tone or half-tone images of high quality and uniform gloss. Such a sheet should be resistant to water absorption and capable of forming images with large toner areas that will not crack as a result of deformation of the paper resulting from water absorption. The paper should not curl or wrinkle. The present invention provides a novel paper receiving sheet for toner images, including continuous tone color images formed by extremely small dry toner particles, that overcome the problems of prior art toner receiving materials.

SUMMARY OF THE INVENTION

The invention provides a novel receiving material for thermoplastic, electrophotographic toners having glass transition temperature or $T_g$ in the range from about 45° C. to 60° C. and comprises (a) a paper support, (b) a hold-out layer comprising a water-resistant, thermoplastic polymer coated on said support, and (c) a toner receiving layer coated on said hold-out layer. In the novel receiving material, the receiving layer comprises a thermoplastic polymer that is coatable from an aqueous medium, has a $T_g$ within 5° C. of the $T_g$ of the toner polymer and is adhesively compatible therewith. The receiving layer when coated and dried on said hold-out layer has a 60° gloss of at least about 60 and not substantially less than the gloss of the toner when the toner is fused and adhered to the receiving layer. The support, toner-receiving layer and conductive hold-out layer together have a volume resistivity in the range of $1.0 \times 10^8$ to $1.0 \times 10^{13}$ ohm-cm.

The invention further provides a method of making a receiving material for electrostatically charged thermoplastic toner. The method comprises forming on an opaque reflective paper support a smooth, water-impermeable, hold-out layer of a thermoplastic polymer, forming a toner-receiving layer by coating on said hold-out layer an aqueous dispersion of a thermoplastic polymer that is adhesively compatible with the polymer of said hold-out layer and adhesively compatible with said toner. The polymer of said toner-receiving layer has a $T_g$ within 5° C. of the $T_g$ of said thermoplastic toner. The toner receiving layer when coated and dried has a 60° gloss of at least 60 and not substantially less than the gloss of said toner when adhered to the receiving layer. The support, toner-receiving layer and conductive hold-out layer together have a volume resistivity in the range of $1.0 \times 10^8$ to $1.0 \times 10^{13}$ ohm-cm.

The invention still further provides a method of forming an electrophotographic image, employing the novel toner receiving material.

THE DRAWINGS

The sole FIGURE of the drawings is a diagramatic cross-section, not to scale, of a toner receiving material of the invention with a toner image formed thereon.

DETAILED DESCRIPTION

In the embodiment shown in the drawings, the toner receiving material of the invention 10 comprises a paper support sheet 11, a water resistant hold-out layer 12 and an aqueously-coated thermoplastic toner receiving layer 13. Areas 14 and 15 of layer 13 comprise pigmented thermoplastic toner particles that are fused to and at least partially embedded in the thermoplastic toner receiving layer. As the drawing shows, the toner receiving materials of the invention can also include optional layers or coatings, such as anti-curl layer 16 on the underside of the support 11.

To form the toned areas on the receiving sheet the entire surface of the toner receiving layer is electrostatically charged. In widely used electrophotographic copiers and laser printers, of which the Kodak® Color Edge copier is an example, the required electrostatic bias between the photoconductor and the toner receiving sheet, is created by backside charging of the receiving sheet. This is accomplished by placing the support side of the receiving sheet on an electrically charged surface. Then if the volume resistivity of the entire receiving sheet, including the support, the hold-out layer and the toner receiving layer is within the required range, a charge is formed on the toner receiving layer.

To produce the necessary electrostatic charge by backside charging, the volume resistivity of the entire receiving sheet, including all layers, and preferably also of each layer, must be in the range from $1.0 \times 10^8$ to $1.0 \times 10^{13}$ ohm-cm. The receiving materials of the present invention have volume resistivity within this range and the preferred materials have volume resistivity in the range from $1.0 \times 10^{10}$ to $1.0 \times 10^{12}$ ohm-cm.

Volume resistivity can be measured by placing a sample of the receiver sheet of known thickness between two electrodes of known area, applying a potential of known voltage to one electrode, and measuring the resulting resistance, using the following formula:

$$P_v = (K_v/t)(R)$$

where $P_v$ is the volume resistivity, $K_v$ is the electrode area, $t$ is the receiver sheet sample thickness, and $R$ is the measured resistance.

After being charged, the receiving sheet is placed in contact with or in close proximity to a photoconductor or transfer member surface that carries a pattern of toner particles of charge opposite to the toner receiving layer charge. Thereupon, the toner particles are electrostatically attracted to the toner receiving layer to form an image pattern thereon. To fix the toner pattern to the toner receiving layer, the toner on the receiving sheet is subjected to heat and pressure, for example, by passing the sheet through the nip of fusing rolls. Both the toner polymer and the thermoplastic polymer of the toner receiving layer are softened or fused sufficiently to adhere together under the pressure of the fusing rolls. As illustrated diagramatically in the drawing, when both the toner receiving layer and the toner soften and fuse, the toner can be at least partially embedded in the thermoplastic toner receiving layer.

In forming toner images on conventional receiving sheets, the fusing and fixing of the toner to the sheet by the fusing rolls, creates gloss in the toned areas, i.e., in the so-called $D_{max}$ or black areas of the image. In the untoned areas, however, the so-called $D_{min}$ or white areas, no gloss is formed. In accordance with the present invention, however, when the toner-bearing receiver sheet is subjected to heat and pressure in the fusing roll nip, the entire surface of the sheet develops a substantially uniform gloss. The resulting electrophotographic image has the look and feel of a glossy silver halide photographic print.

The support on which are coated the hold-out layer and the toner receiving layer for the materials of the invention is a paper sheet or web of the kinds useful as reflective imaging supports for electrophotography or silver halide photography. The support should have a volume resistivity in a range such that the coated product will have the required volume resistivity. More specifically, the coated material of the invention, including the support, the hold-out layer, the toner receiving layer and any additional optional layers should have a volume resistivity in the range from $1.0 \times 10^8$ to $1.0 \times 10^{13}$ ohm-cm. Preferably, the volume resistivity of the paper support is in this same range.

To provide the required volume resistivity, the paper support can include conductive components in its original make-up or can be treated with conductive agents to adjust the resistivity. For example, a paper stock of which the resistivity exceeds the required range can be treated by sizing or by the addition of a conductive agent in the paper making process.

A preferred support, and one that is illustrated in the examples below, is a 6 or 8 mil thick white paper of photographic quality that has been sized or treated to bring its volume resistivity to the range from $1.0 \times 10^8$ to $1.0 \times 10^{13}$ ohm-cm. A preferred agent for treating the paper is the conductive agent, Calgon 261-XLV™, a quaternary ammonium polymer manufactured by Calgon Corp.

After treating the support, if necessary to bring its volume resistivity to the required level, the support is then coated to form a hold-out layer. If an anticurl, anti-stat or other coating is desired on the underside of the support, it can be applied before or after forming the hold-out layer on the upper surface of the support. Important qualities of the hold-out layer include its resistance to water, its volume resistivity and its adhesive compatibility with the toner receiving layer which is coated over the hold-out layer. The resistance to water makes possible the coating of the toner receiving layer from an aqueous medium. An important advantage of the present invention is that the environmental and economic disadvantages of organic solvent coating can be avoided. By providing a water-resistant hold-out layer in accordance with the invention, aqueous coating of the toner receiving layer can be practiced while protecting the paper support from contact with water which could otherwise cause the paper to curl or wrinkle or could change its resistivity.

The hold-out layer can be applied to the support by solvent coating, aqueous coating, or melt extrusion. Known coating methods capable of forming smooth surfaces can be employed, including gravure coating, bead coating, rod coating and spray coating. Both front and back sides can be coated to provide duplex imaging if desired. The hold-out layer by itself and in combination with the paper substrate should have a volume resistivity in the range from $1.0 \times 10^8$ to $1.0 \times 10^{13}$ ohm-cm and, preferably from $1.0 \times 10^{10}$ to $1.0 \times 10^{12}$ ohm-cm. The preferred thickness of the hold-out layer is from 1 to 15 $\mu$m and, most preferably, is from 2 to 5 $\mu$m.

Water-resistant, as used herein with reference to the hold-out layer means that the layer is sufficiently resistant to water penetration that when an aqueous coating of toner receiving layer polymer is applied to the layer and then dried, the aqueous vehicle of the coating does not penetrate the hold-out layer before drying is complete.

Thus, a material such as unhardened gelatin, which is permeable to water after lengthy contact at elevated temperature, is sufficiently water resistant to serve as a hold-out layer in the materials of the present invention. When an aqueous solution or suspension of a toner receiving layer polymer is coated on a gelatin hold-out layer at room temperature and then promptly dried, the gelatin will resist penetration by the water sufficiently to protect the paper support.

The term "smooth" as applied to the hold-out layer means that the layer is sufficiently smooth that when a toner receiving layer having a dry thickness of 5 to 20 $\mu$m, or 8 to 12 $\mu$m in a preferred embodiment, is coated and dried on the hold-out layer its 60° gloss will be at least about 60.

Adhesively compatible, as applied herein to the adhesion of the hold-out layer to the toner receiving layer, means that the layers adhere so strongly that they cannot be pulled apart or separated from each other without damaging on or both layers. As applied to the adhesion of the toner to the toner receiving layer the term means that toner after fixing to the toner receiving layer cannot be removed by the conventional adhesive tape test. In that test, a strip of pressure sensitive adhesive tape, such as the well-known Scotch® brand tape is applied to an area of the toned sheet where the toner is fixed. When the tape is then stripped away, no toner is removed from the sheet if the toner and the toner receiving layer are adhesively compatible.

Preferred materials for the hold-out layer include: (a) Gelatin 32, a gelatin, manufactured by Eastman Kodak Company through the hydrolysis of collagen by boiling ligaments and bones of cows and alkaline treating; (b) Calgon™ 261 XLV, a quaternary ammonium cationic polymer of the monomer:

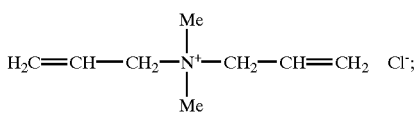

(c) Elvax-40™, which is an ethylene-vinyl acetate copolymer (60/40 mol ratio), (d) poly (vinyl acetate) and (e) a polyurethane and polyoxirane compound, Stat-Rite M809 from B F Goodrich Specialty Chemicals and two polyurethane/polyether thermoplastics, Stat-Rite E1140 and Stat-Rite E1150, also from B F Goodrich Specialty Chemicals, as described in U.S. Pat. Nos. 5,342,889 and 5,159,053, the disclosures of which are incorporated herein by reference.

As stated above, gelatin is a preferred material for the hold out layer. When coating the gelatin on the paper support, the gelatin normally will be employed as aqueous dispersion. Accordingly, the preferred procedure is to coat the gelatin on the paper and, promptly thereafter, to chill set the gelatin. This prevents or reduces the penetration of water into the paper.

To form the toner receiving material of the invention, a toner receiving layer is applied over the hold out layer by aqueous coating. Both front and back sides can be coated with the hold out layer and toner receiving layer to provide for duplex imaging, if desired. The toner receiving layer or layers, combined with the paper support and the hold out layer or layers, in order to be electrically charged and discharged in the transfer process, have a volume resistivity in the range of $1.0 \times 10^8$ to $1.0 \times 10^{13}$ ohm-cm and, preferably, from $1.0 \times 10^{10}$ ohm-cm to $1.0 \times 10^{12}$ ohm-cm.

The toner receiving layer comprises a thermoplastic polymer or thermoplastic blend of polymers that have a glass transition temperature or $T_g$ that is close to that of the thermoplastic toner that is transferred to the toner receiving layer. Preferably, the $T_g$ of the toner receiving layer is within 5° C. of the $T_g$ of the toner. Consequently, both the toner and the receiving layer soften or melt when the toner is fixed to the receiving layer by heat and pressure. This contributes to the adhesion of the toner to the layer and to achieving of high gloss in both the toned ($D_{max}$) and untoned ($D_{min}$) areas of the image.

Environmental problems are reduced or eliminated in making the receiving sheets of the invention by coating the toner receiving layer from an aqueous medium. Commercially available aqueous dispersions of thermoplastic polymers having the required $T_g$ and adhesive compatibility with the toner and with the polymer of the hold-out layer can be used.

Examples of preferred materials for the toner receiving layer include the following:

(1) styrene-acrylic copolymer compositions disclosed in U.S. Pat. No. 5,098,952, incorporated herein by reference, and related products of S.C. Johnson Corp., including Joncryl 52™ (comprising a copolymer of styrene, α-methylstyrene, acrylic acid, methyl methacrylate, butyl acrylate and 2-ethylhexyl acrylate, which has a styrene acrylic acid backbone), Joncryl 77™ and Joncryl 89™ polymeric compositions;

(2) the alkali metal salt (specifically, sodium) of a copolymer of styrene/n-butyl methacrylate/2-sulfoethyl methacrylate (60/30/10 molar ratio);

(3) Latiseal B7440A™ polyurethane heat seal product of Pierce & Stevens Corp., which comprises a thermoplastic polymer of the monomer:

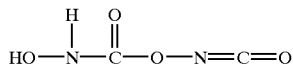

The following examples further illustrate toner-receiving materials of the invention and the method of making them.

EXAMPLE 1

To a 10 wt % aqueous solution of Gelatin-32 was added Olin-10G™ surfactant at 0.05 wt %. The solution was coated on both sides of a corona discharge-treated photographic grade paper 8 mils in thickness to form a hold-out layer on the paper support at a dry coverage of 0./25 g/ft².

EXAMPLE 2

The procedure of Example 1 was followed except that the coating solution was a 10 wt % solution of Calgon CP-261XLV in methanol and water at a 60/40 weight ratio to which was added Olin 10G surfactant at 0.05 wt %.

EXAMPLE 3

The procedure of Example 1 was followed except that the coating solution was an 8 wt % solution of Stat-Rite M809 in tetrahydrofuran to which was added DC-510 surfactant at 0.05 wt %.

EXAMPLE 4

The procedure of Example 1 was followed except that the coating solution was an 8 wt % solution of Stat-Rite E-1140 was prepared in tetrahydrofuran to which was added DC-510 surfactant at 0.05 wt %.

EXAMPLE 5

The procedure of Example 1 was followed except that the coating solution was an 8 wt % solution of Stat-Rite E-1150 in tetrahydrofuran to which was added DC-510 surfactant at 0.05 wt %.

EXAMPLE 6

The procedure of Example 1 was followed except that the coating solution was a 15 wt % solution of Elvax-40W in ethyl acetate to which was added DC-510 surfactant at 0.05 wt %.

EXAMPLES 7–12

Each of the hold-out coated papers of Examples 1–6 was corona discharge treated and then coated on both sides at a dry coverage of 1.0 g/ft.² with a 20 wt % aqueous solution of Joncryl-52 containing Olin-10G surfactant at 0.10 wt % to form toner receiving layers.

COMPARATIVE EXAMPLE 13

The solution of Example 1 was coated on a resin-coated photographic paper, the resin being a non-conductive polyolefin. The solution was coated and dried on both sides of corona discharge-treated, resin-coated paper at a dry coverage of 1.0 g/ft². Thereafter, the polyolefin coated paper was coated on both sides with the Joncryl-52 solution as in Examples 7–12.

Results of toner transfer and volume resistivity measurements are listed in the following table.

TABLE 1

| Example | Hold out Layer | Volume Resistivity (ohm-cm) | Transfer |
| --- | --- | --- | --- |
| 7 | Gelatin | $1.10 \times 10^9$ | Good |
| 8 | Calgon CP 261XLV | $7.17 \times 10^{10}$ | Good |
| 9 | Stat-Rite M809 | $7.54 \times 10^{10}$ | Good |
| 10 | Stat-Rite E1140 | $1.17 \times 10^{11}$ | Good |
| 11 | Stat-Rite E1150 | $1.08 \times 10^{11}$ | Good |
| 12 | Elvax-40W | $2.34 \times 10^{10}$ | Good |
| 13 | Polyolefin | $1.56 \times 10^{14}$ | Poor |

The data in Table I indicate that, when the toner receiving material comprises a hold-out layer and a thermoplastic toner receiving layer of appropriate volume resistivity, good transfer of the toner to the receiving material is obtained. Consequently, the image quality is excellent. In contrast, when the hold-out layer is a non-conductive resin of excessively high volume resistivity (Example 13) the transfer of toner and the resulting image are poor.

Toner receiving materials of the invention having other preferred toner receiving layers are illustrated by the following examples.

EXAMPLE 14

Preparation of Support with Hold-Out Layer

An 8 mil thick photographic grade paper was sized by soaking it an aqueous bath of 20 wt. percent solids Calgon 261-XLV cationic polymer and pressing at 150 psi. The sized paper was then dried in a convection oven. The dried paper was corona discharge treated on both sides and then coated on both sides with 10 wt. % aqueous solution of "Gelatin-32" to which was added Olin 10-G surfactant at 0.05 wt. %. The coatings were dried and provided hold-out layers at a dry coverage of 0.25 g/ft.$^2$.

EXAMPLE 15

To a 20 wt % aqueous solution of Joncryl-52 was added Olin-10G surfactant at 0.10 wt %. The solution was coated on the hold-out layers on both sides of the coated and corona discharge treated paper, prepared as described in Example 14, at a dry coverage of 1.0 g/ft$^2$.

EXAMPLE 16

To a 20 wt % aqueous solution of a blend of Joncryl 89, Joncryl 77, and Joncryl 52 at a weight ratio of 13/47/40, was added Olin-10G surfactant at 0.10 wt %. The solution was coated on the hold-out layers on both sides of the coated and corona discharge treated paper of Example 14 at a dry coverage of 1.0 g/ft$^2$.

EXAMPLE 17

To a 20 wt % aqueous solution of styrene/N-butylmethacrylate/2-sulfoethyl methacrylate sodium salt, 60/30/10 was added Olin-10G surfactant at 0.10 wt %. The solution was coated on the hold-out layers on both sides of the coated and corona discharge treated paper of Example 14 at a dry coverage of 1.0 g/ft$^2$.

EXAMPLE 18

To a 20 wt % aqueous solution of Latiseal B7440A was added Olin-10G surfactant at 0.10 wt %. The solution was coated on the hold-out layers on both sides of the coated and corona discharge treated paper of Example 14 at a dry coverage of 1.0 g/ft$^2$.

Each of the coated toner receiving papers of the invention described in Examples 15–18 was imaged and fused in the Kodak Color Edge 1550 Color Copier/Printer.

COMPARATIVE EXAMPLE 19

A control clay coated paper (Scott Lustro Laser paper) was imaged and fused in the same manner as in Examples 15–18. This paper had no toner receiving layer or hold-out layer coated on it.

The gloss measurements for the toner bearing papers of all of the above examples were made with a Gardner Micro Tri Gloss Meter, Model 4520, at 60 degree setting. The measurements were taken at D-max(black) and D-min (white). The results are summarized in Table 1.

TABLE 2

| Example | Toner Receiving Layer | 60° Gloss | |
| --- | --- | --- | --- |
| | | D-max | D-min |
| 15 | Joncryl-52 | 96 | 92 |
| 16 | Joncryl Blend | 92 | 91 |
| 17 | SKWD | 89 | 88 |
| 18 | Latiseal B7440A | 90 | 89 |
| 19 | NONE | 87 | 37 |

The examples of the present invention (Examples 15–18) all show gloss levels which are high and substantially uniform between the D-max and D-min areas. However, Example 19 which had no toner receiving layer or hold-out layer exhibited gloss only in the $D_{max}$ areas.

The invention has been described in detail with particular reference to preferred embodiments thereof, but it will be understood that variations and modifications can be effected within the spirit and scope of the invention.

What is claimed is:

1. A receiving material for thermoplastic, electrophotographic toners having $T_g$ in the range from about 45° C. to 60° C. comprising:

(a) a paper support, (b) a smooth, water-resistant polymeric conductive hold-out layer coated on said support, and (c) a toner receiving layer coated on said conductive hold-out layer;

wherein said receiving layer comprises a thermoplastic polymer that is coatable from an aqueous medium, has a $T_g$ within 5° C. of the $T_g$ of the toner polymer and is adhesively compatible with said toner and with said conductive hold-out layer; said receiving layer when coated and dried on said hold-out layer has a 60° gloss of at least about 60 and not substantially less than the gloss of the toner when said toner is fused and adhered to the receiving layer; and said support, toner receiving layer and conductive hold-out layer together have a volume resistivity in the range of $1.0 \times 10^8$ to $1.0 \times 10^{13}$ ohm-cm and wherein the support and the hold-out layer each have a volume resistivity in the range of $1.0 \times 10^8$ to $1.0 \times 10^{13}$ ohm-cm.

2. A receiving material according to claim 1 wherein said conductive hold-out layer comprises gelatin, a quaternary ammonium cationic polymer, an ethylene-vinyl acetate copolymer, poly(vinyl acetate) or a polyurethane/polyether.

3. A receiving material according to claim 1 wherein said conductive hold-out layer comprises gelatin, a quaternary ammonium cationic polymer, an ethylene-vinyl acetate copolymer, poly(vinyl acetate) or a polyurethane/polyether, said toner receiving layer comprises (a) a styrene-acrylic copolymer, (b) an alkali metal salt of a copolymer of styrene, n-butyl acrylate and 2-sulfoethyl methacrylate or (c) a polyurethane, and said support, toner receiving layer and conductive hold-out layer together have a volume resistivity in the range of $1.0 \times 10^{10}$ to $1.0 \times 10^{12}$ ohm-cm.

4. A receiving material according to claim 1 wherein said conductive hold-out layer consists essentially of gelatin.

* * * * *